United States Patent [19]

Searle

[11] Patent Number: 4,737,170

[45] Date of Patent: Apr. 12, 1988

[54] MOLECULAR SIEVE BED CONTAINERS

[75] Inventor: Robin H. J. Searle, Yeovil, England

[73] Assignee: Normalair-Garrett (Holdings) Ltd., Yeovil, England

[21] Appl. No.: 928,391

[22] Filed: Nov. 10, 1986

[30] Foreign Application Priority Data

Nov. 15, 1985 [GB] United Kingdom ............... 8528249

[51] Int. Cl.⁴ .................................................. B01D 53/04
[52] U.S. Cl. ....................................... 55/179; 55/162; 55/389; 55/475
[58] Field of Search ............................... 55/161–163, 55/179, 180, 387, 389, 475

[56] References Cited

U.S. PATENT DOCUMENTS

| | | | |
|---|---|---|---|
| 3,103,425 | 9/1963 | Meyer | 55/179 X |
| 3,365,861 | 1/1968 | Crowley et al. | 55/162 |
| 3,849,089 | 11/1974 | Ritter et al. | 55/179 X |
| 4,203,401 | 5/1980 | Kingsley et al. | 55/387 X |
| 4,342,573 | 8/1982 | McCombs et al. | 55/179 X |
| 4,386,945 | 6/1983 | Gardner | 55/180 X |
| 4,428,372 | 1/1984 | Beysel et al. | 55/179 X |
| 4,448,592 | 5/1984 | Linde | 55/179 X |
| 4,496,376 | 1/1985 | Hradek | 55/163 |
| 4,502,873 | 3/1985 | Mottram et al. | 55/389 X |
| 4,581,047 | 4/1986 | Larsson | 55/179 |

FOREIGN PATENT DOCUMENTS

| | | | |
|---|---|---|---|
| 512827 | 11/1930 | Fed. Rep. of Germany | 55/179 |
| 2013101 | 8/1979 | United Kingdom | 55/179 |
| 2103954 | 3/1983 | United Kingdom | 55/179 |

Primary Examiner—Robert Spitzer
Attorney, Agent, or Firm—Larson and Taylor

[57] ABSTRACT

A molecular sieve bed container provides a plurality of molecular sieve bed chambers. The chambers are formed by tubular wall members concentrically located within a tubular outer housing and are closed at their ends by end closure members. One end closure member incorporates valves (not shown in FIG. 1) for controlling supply of charge gas to the sieve bed chambers and venting of purge gas from the sieve bed chambers. The other end closure member incorporates valves for controlling passage of product gas from the sieve bed chambers to an outlet (not shown) and portways for permitting some of the product gas to flow back through the sieve bed chambers as purge gas during a purge/vent phase. In the illustrated embodiment three sieve bed chambers are filled with a molecular sieve material which is given to removal of nitrogen from air supplied to the container as charge gas while two chambers are filled with a molecular sieve material which is given to removal of oxygen whereby supplies of oxygen-enriched air and nitrogen-enriched air are delivered as product gases.

6 Claims, 4 Drawing Sheets

MOLECULAR SIEVE BED CONTAINERS

BACKGROUND OF THE INVENTION

1. Field of the Invention

This invention relates to molecular sieve bed containers and is more particularly concerned with the form and construction of molecular sieve bed containers for gas separation apparatus.

2. Description of the Prior Art

It is current practice in molecular sieve type gas separation apparatus and systems having multiple sieve beds for each sieve bed to be provided in an individual container. Examples of such systems, which are particularly suited for the production of oxygen-enriched air for breathing by aircrew in an aircraft application, are disclosed in EP-A-0,080,300 and EP-A-0,129,304 (Normalair-Garrett). However, as with all ancillary equipment required to be carried by an aircraft, it is of great advantage for molecular sieve beds to be of minimum size and weight compatible with required performance and physical integrity.

GB-A-2,013,101 (Bendix) discloses apparatus for producing oxygen-enriched air wherein pressurised air is passed through a molecular sieve bed which removes nitrogen from the supply air and through which a portion of the oxygen-enriched product gas is passed as a purge gas for regenerating the molecular sieve material. The sieve bed is defined by a housing or container which provides a larger flow area at the inlet face of the bed than at the outlet face thereof.

In one disclosed embodiment a sieve bed is formed by an annular portion having one flow area disposed around a tubular core of a lesser flow area and arranged so that flow through the bed reverses its direction under an end cap at one end of the container in passing from the annular part to the tubular core. In another disclosed embodiment of simpler form the sieve bed is of a frusto-conical shape having a single pass flow-path from an inlet end of one flow area to an outlet end of a smaller flow area.

Thus, GB-A-2,013,101 is concerned to provide a container for an individual molecular sieve bed which matches velocity of product gas output from the sieve bed with that of supply gas input to the sieve bed thereby compensating for the gas element of the supply gas which is adsorbed by the molecular sieve material.

SUMMARY OF THE INVENTION

It is an object of the present invention to provide a molecular sieve bed container which embodies a plurality of molecular sieve beds whilst being compact in size and low in weight so as to be particularly suited for use in an aircraft on-board gas separation apparatus.

Accordingly, the present invention provides a molecular sieve bed container comprising a plurality of concentric tubular members, a respective end closure member closing respective opposite ends of the concentric tubular members, a plurality of discrete chambers defined by the concentric tubular members and end closure members and each being of substantially constant cross-sectional area in extending between the end closure members, a plurality of separate molecular sieve beds provided by molecular sieve material filling the discrete chambers, one of the end closure members providing means for passing a supply of charge gas into the sieve beds, and means for venting purge gas from the sieve beds, the other end closure member providing means for delivering a supply of product gas from the sieve beds and means for passing some of said product gas back through the sieve beds as purge gas.

The inner concentric tubular wall members may be sealed with at least one of the end closure members by annular resilient sealing elements.

Preferably, filter plates are provided at each end of each sieve bed between molecular sieve material in the bed and the end closure members for retention of the molecular sieve material and any dust associated therewith.

Springs may be provided between the end closure member and filter plates at one end of the container so as to act on the filter plates and thereby retain molecular sieve material in the sieve beds in a compact condition. Each end closure member may incorporate valve means for controlling the flow of gas into and out of the sieve beds, the valve means incorporated in the end closure member providing passage means for flow of charge gas into the sieve beds and venting of purge gas from the sieve beds comprising an individual pair of valve associated with each respective sieve bed.

The valve means incorporated in each end closure member may comprise diaphragm valves. Opening and closing of each valve in a pair of such valves controlling supply of charge gas to a sieve bed and venting of purge gas from a sieve bed may be controlled by solenoid operated valve means.

Alternatively, each valve in a pair of such valves may be controlled by gas operated servo valve means carried on the exterior of the end closure members.

Solenoid operated valve means or gas operated servo valve means may be actuated by an electronic timer which may provide a single overall cycle time with the ratio of charge period to vent period being fixed at a predetermined value such as 1:1 or 2:1, or it may provide two or more different overall cycle times with the ratio of the charge period to vent period for each cycle time being fixed at a common predetermined value such as 1:1 or 2:1. The two or more predetermined overall cycle times may be switched from one to another by a control loop sensing a parameter of the system gases, such as the concentration value of the product gas, or by an external parameter, such as altitude.

A molecular sieve bed container in accordance with one embodiment of the invention has each sieve bed chamber filled with a molecular sieve material suited to retaining nitrogen in air supplied to the container so that oxygen-enriched air is delivered as product gas from the container.

A molecular sieve bed container in accordance with another embodiment of the invention has some of the sieve bed chambers filled with molecular sieve material suited to retaining nitrogen in air supplied to the container whilst the others of the sieve bed chambers are filled with a molecular sieve material suited to retaining oxygen in air supplied to the container so that both oxygen-enriched air and nitrogen-enriched air are delivered as product gases from the container.

In this latter embodiment of the invention those chambers containing nitrogen retaining molecular sieve material all have the same individual volume, as do those chambers containing oxygen retaining molecular sieve material but each of these latter chambers is of larger volume than the chambers containing nitrogen retaining molecular sieve material.

The concentric arrangement of discrete sieve bed chambers allows the interior wall structures to be of minimal thickness appropriate to the required physical integrity, only the outer wall of the container requiring to have a thickness providing normal rigidity and protection to the container as a whole. This enables a large proportional reduction in overall weight relative to a set of comparable molecular sieve beds provided in individual containers and, also, a reduction in the space envelope required to accommodate the container housing the discrete chambers.

BRIEF DESCRIPTION OF THE DRAWINGS

The invention will now be further described by way of example with reference to the accompanying drawings in which.

DETAILED DESCRIPTION OF THE INVENTION

Figure 1:
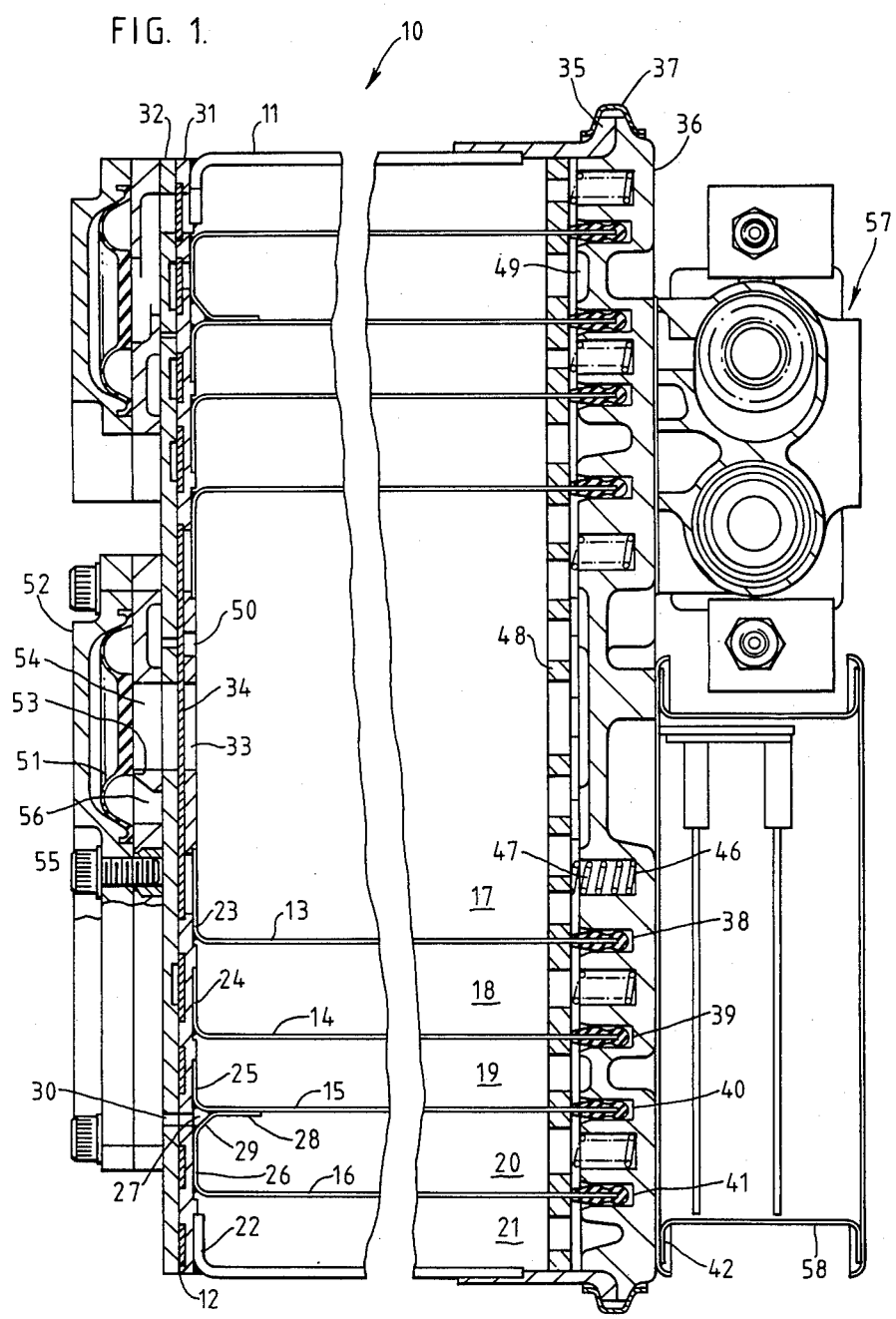
FIG. 1 shows a fragmented longitudinal cross-sectional view of a molecular sieve bed container in accordance with one embodiment of the invention.

Referring to the drawings a molecular sieve bed container 10 includes a tubular outer housing 11 manufactured from rigid impervious material having a thickness dimension in the order of 1.5 mm and sealingly secured at one end to an endplate or closure member 12. Four tubular wall structures 13, 14, 15 and 16, each having a wall thickness dimension in the order of 0.8 mm are positioned concentrically within the housing 11 and are also sealingly secured to the closure member 12. This concentric structural arrangement provides four discrete annular molecular sieve bed chambers 18, 19, 20, 21 and a central cylindrical molecular sieve bed chamber 17. The three chambers 17, 18, 19 are filled with a molecular sieve material which is given to nitrogen removal and the two chambers 20, 21 are filled with a molecular sieve material which is given to oxygen removal from air passing through the container. The central chamber 17 and the two annular chambers 18, 19 each have the same individual volume. The two annular chambers 20, 21 also each have the same individual volume, but their volumes are greater than the volumes of the chambers 17, 18, 19.

The sealed securement to the closure member 12 of the outer housing 11 and the four wall structures 13, 14, 15, 16 is obtained by forming the foot of each of these as an annular flange 22, 23, 24, 25, 26, respectively, these flanges being brazed, welded or bonded as appropriate to the closure member 12.

At the junction of the closure member 12 and the wall structure 15 which separates the chambers 17, 18, 19 given to nitrogen separation from the chambers 20, 21 given to oxygen separation, an annular gas drainage chamber 27 is provided. This is obtained by means of the annular flange 26 at the foot of the wall structure 16 having a returned section 28 so that the foot is in the form of an annular channel. A transition section 29 from the flange 26 to the returned section 28 is made over a short distance at an angle of, conveniently, 45° whereby the gas drainage chamber 27 is formed as an annular channel defined by surfaces provided by the transition section 29, the wall structure 15 and the closure member 12. Vent ducts 30 are provided in the closure member 12 connecting the gas drainage chamber 27 with ambient atmosphere.

The closure member 12 comprises two plate elements 31, 32 which are integrated in facial contact such as by electron beam welding. The two plate elements are appropriately ported, a port 33 from chamber 17 being shown in FIG. 1, to provide for emission from each of the chambers 17, 18, 19 and 20, 21 of the respective product gases thereof. Annular mesh guards 34 are trapped in recesses between the two elements 31, 32 for prevention of the egress of molecular sieve material from the discrete chambers into the ports. Small portways are provided within the closure member 12 and entered by way of ports 50, one of which is shown in FIG. 1 leading from chamber 17, for enabling some oxygen product gas to pass as purge gas from and to any of the discrete chambers 17, 18, 19 which are given to nitrogen separation. Similar portways and ports (not shown) are provided to pass some nitrogen product gas as purge gas from and to the two discrete chambers 20, 21 which are given to oxygen separation.

The end of the outer housing 11, remote from the closure member 12, terminates in an annular V flange 35 which provides a closing and sealing contact with a mating flange on an end cap closure member 36 and is retainable therewith by means of an associating resilient clamp ring 37 of known form.

The end cap closure member 36 is provided on its inner side with concentric grooves 38, 39, 40, 41 which are arranged to receive the other ends of the wall structures 13, 14, 15, 16, respectively, these ends being fitted into slotted annular resilient sealing elements 42 having peripheral sealing relationship with the walls of the grooves 38, 39, 40, 41.

Figure 2:
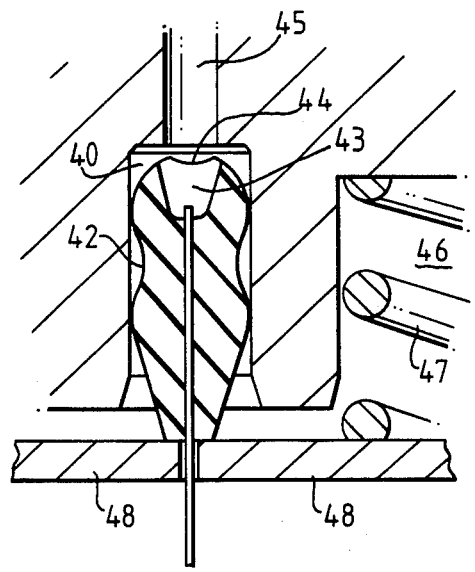
FIG. 2 illustrates a sealing and vent feature of the container shown in FIG. 1.

Referring to FIG. 2, the sealing element 42 associated with the wall structure 15 which separates the discrete chambers 19, 20 that are given to obtaining different product gases is so formed as to provide an annular gas collecting duct 43 extending from and beyond the end of the inserted wall structure 15 for enabling any collected gas seepage to pass to ambient atmosphere by way of apertures 44 in its end wall and vent ducts 45 provided at the bottom of the groove 40.

The end cap closure member 36 is also provided with a series of pockets 46 equally spaced around the mean pitch circle diameter dimension of each chamber 18, 19, 20, 21 and around a suitable outer diameter dimension of the core chamber 17, for the location of compression springs 47 arranged to urge perforated pressure plates 48 onto the molecular sieve material in each of the chambers so as to hold the material in a predetermined lightly compacted and firm condition.

The end cap closure member 36 also provides, for each chamber 17, 18, 19, 20, 21, an inlet/outlet port (not shown) for charging the molecular sieve bed in the chamber with pressurised air and for venting an effluent gas from the bed. Each inlet/outlet port connects with an annular groove 49 positioned between two adjacent spring pockets 46 and opening into a respective one of the discrete chambers.

Figure 3:
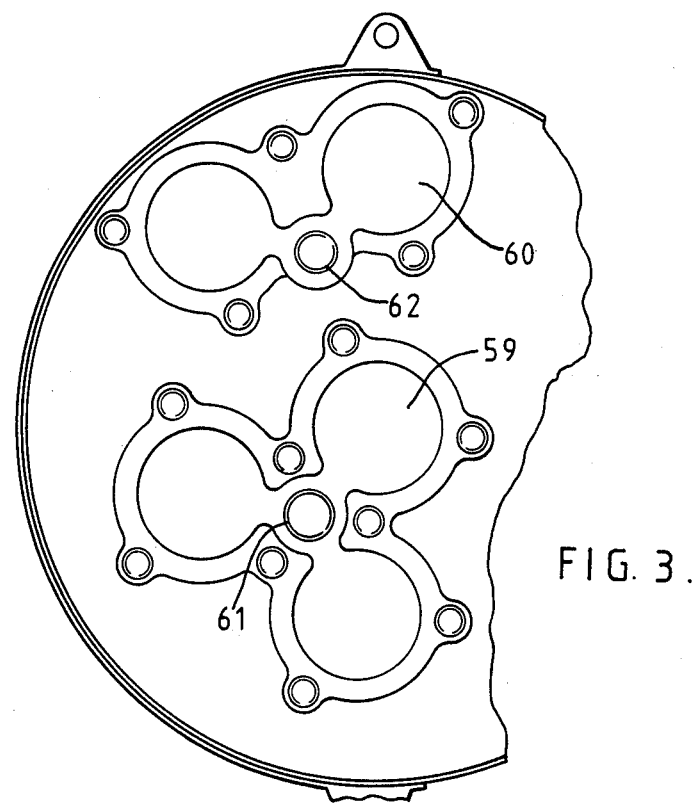
FIG. 3 is a fragmented end view of the container shown in FIG. 1.

The closure member 12 is adapted to carry valve means for control of the delivery of product gas from each sieve bed chamber 17, 18, 19, 20, 21 and whilst various valve types are functionally acceptable this embodiment utilises simple diaphragm valves 51 each of which is peripherally sealed and retained in a housing 52 and has a central area that cooperates with a valve seat 53 that circumscribes an inlet 54 connecting with the interio of the chamber by way of the port 33 in the closure member 12. An annular space 55 around the valve seat 53 that is defined on one side by the outer portion of the valve 51 provides the outlet therefrom which communicates with a respective product gas collection chamber 59, 60 and delivery connection 61, 62 (reference FIG. 3).

The diaphragm of the valve in its outer portion, is pierced by a small orifice 56 which enables collection chamber pressure to be effective in a manner for closing the valve 51 on to its seat 53. These product gas control valves 51 open and close automatically according to pertaining working pressures of the system so that, for example, during a charging phase when the pressure in a sieve bed chamber is above that in the product gas collection chamber, owing to withdrawal of gas therefrom by a user, the associated valve 51 lifts; conversely, while the pressure in the sieve bed chamber is below that in the product gas collection chamber during a regeneration phase, the valve 51 is held closed by the greater pressure of the collection chamber gas.

The application of purge gas to each sieve bed chamber is also automatic, being made by relative gas pressures during overlapping cycling of the sieve beds as they alternate through charging and regenerating phases. The inclusion of small portways in the purge flow paths (an entry to which is seen at 50) obviates the need for any valved control thereof.

The end cap closure member 36 is adapted to carry valve means for admission of pressurised air to charge the molecular sieve beds of the chambers of the container 10 and alternately for release of effluent gas therefrom. Whilst various valve types are functionally acceptable, such as pad, spool, gate and other valves, this embodiment favours an arrangement including simple diaphragm valves (not shown) that respond to supply and to bed pressure and which are controlled by sequentially operating pneumatic servo-valves 57 switched by an electronic timer 58, also mounted on the end cap closure member 36, that has two or more predetermined overall cycle times within each such cycle time there are two periods of fixed ratio, determining the charge and regeneration phases respectively. The electronic timer may be caused to switch from one overall cycle time to another by such means as altitude switches or by sensing a parameter of the working gases, preferably the concentration value of an element of the product gas.

A molecular sieve bed container providing a plurality of molecular sieve bed chambers, in accordance with this embodiment of the invention, is particularly suited for use with gas separating apparatus in an aircraft application. The oxygen-enriched product gas is available for breathing by aircrew, whilst the nitrogen-enriched product gas provides a substantially inert gas which may be used for such purposes as preventing explosive gas mixtures from collecting over fuel in the fuel tanks of the aircraft.

Figure 4:
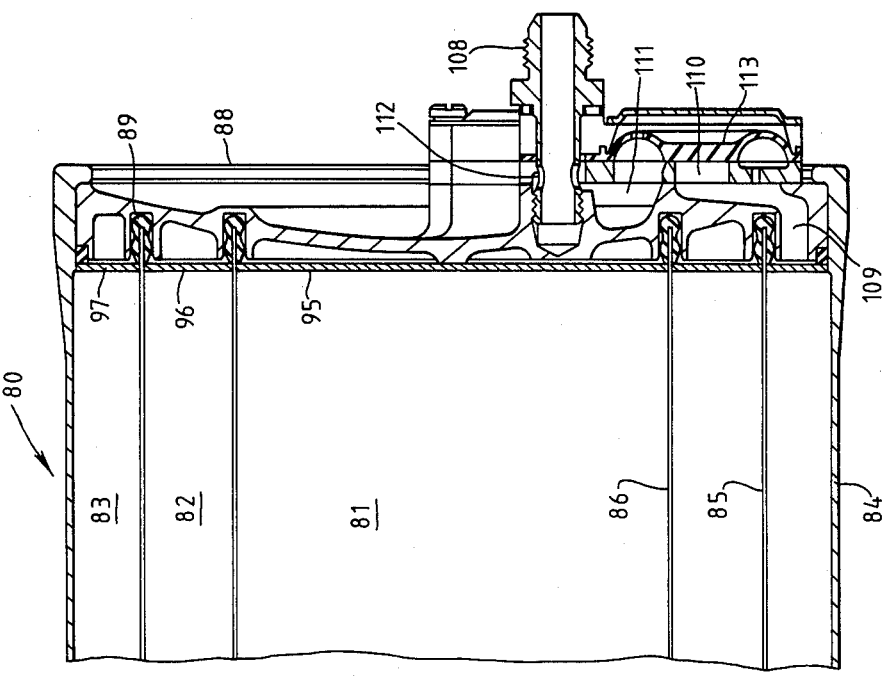
FIG. 4 shows a fragmented longitudinal cross-sectional view of a molecular sieve bed container in accordance with another embodiment of the invention.
Figure 4:
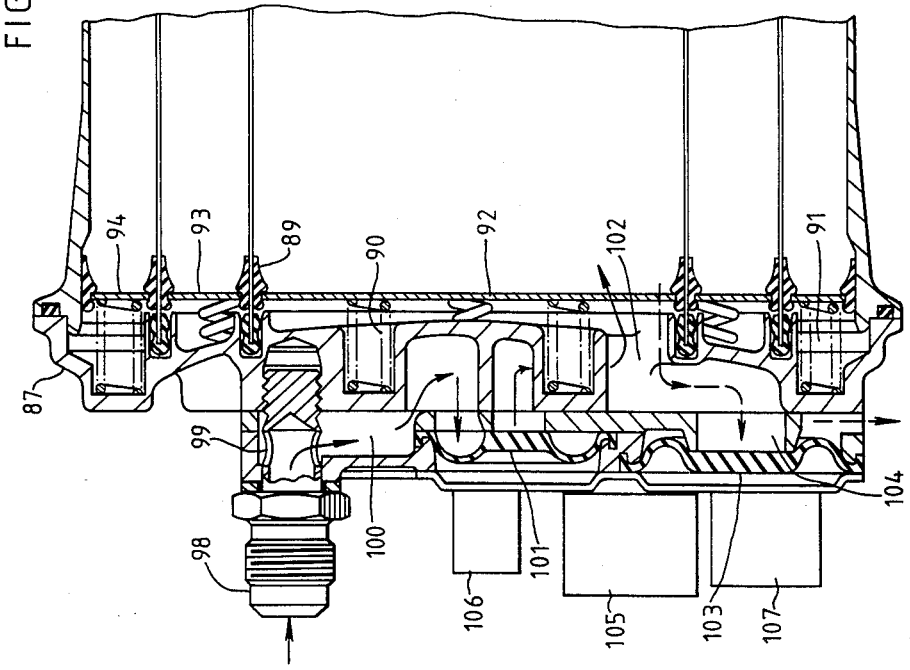

In another embodiment of the invention, illustrated in FIG. 4, a molecular sieve bed container 80 provides three molecular sieve bed chambers 81, 82, 83. When filled with molecular sieve material these chambers provide molecular sieve beds which are suited for retention of a constituent gas (for example nitrogen) in a gas mixture (for example air) supplied to the container as a charge gas, so that, for instance, oxygen-enriched air is delivered as product gas. The container 80 comprises a tubular outer housing 84 having a wall thickness dimension in the order of 1.5 mm and two inner tubular wall structures 85, 86 of different diameter dimensions and each having a wall thickness dimension in the order of 0.8 mm, concentrically located within the outer housing, this assembly being closed by respective end closure members 87 and 88. In this embodiment the tubular wall structures 85, 86 are sealed with each of the end closure members 87, 88 by resilient sealing elements 89 which seat in annular grooves in the end closure members.

Molecular sieve material in the chambers 81, 82, 83 is held in a compacted condition by springs 90 located in pockets 91 provided in the end closure member 87 and acting on a disc shaped filter plate 92 in the case of the central chamber 81, and annular filter plates 93, 94, in the case of the annular chambers 82 and 83, respectively. The plates 92, 93, 94 are manufactured from sintered aluminum filter material which allows gas to pass whilst retaining the molecular sieve material and any dust associated therewith. Similar filter plates 95, 96, 97 are provided between the molecular sieve material and the end closure member 88.

End closure member 87 is provided with a threaded union 98 for attachment of a hose (not shown) whereby charge gas is supplied to the container 80. Charge gas flows from ports 99 in the union 98 into a passageway 100 provided in the end closure member 87 and, following the path shown by the solid arrows, flow past diaphragm valve 101 (shown closed in FIG. 4) when this valve is open to enter the sieve bed chamber 81 by way of passageway 102 and filter plate 92.

A similar diaphragm valve 103 closes an outlet port 104 connected with passageway 102 and, when open, allows purge gas to vent from the sieve bed chamber 81 to ambient atmosphere following the path shown by the broken arrows.

Pairs of diaphragm valves (not shown) similar to diaphragm valves 101 and 103 are provided for the sieve bed chambers 82 and 83. Opening and closing of the respective pairs of diaphragm valves of the respective sieve bed chambers 81, 82, 83 are controlled by solenoid valves 105, 106 and 107 associated one with each pair of diaphragm valves. Operation of a solenoid valve and a pair of diaphragm valves will be further described hereinafter.

End closure member 88 is provided with a threaded union 108 for connection with a hose (not shown) by which product gas is delivered to an end user. Product gas flowing from the sieve bed chambers 81, 82, 83 flows through the filter plates 95, 96, 97 into passageways in the end closure member 88, such as passageway 109 associated with sieve bed chamber 83, and then by way of outlet ports, such as outlet port 110 associated with passageway 109, to a gas collection chamber 111 having connection with the threaded union 108 by way of ports 112 in the union 108. Each outlet port is adapted for closure by a diaphragm valve, for example diaphragm valve 113 closing outlet port 110, operation of these diaphragm valves being similar to that hereinbefore described for the diaphragm valves 51 of the end closure member 12 provided for the container 10 shown in FIG. 1 of the drawings.

Also, application of purge gas to each of the sieve bed chambers 81, 82, 83 is automatic, being made by relative gas pressures during overlapping cycling of the sieve beds as they alternate through charging and regenerating phases, in similar manner to that hereinbefore described for the container 10 shown in FIG. 1.

Figure 5:
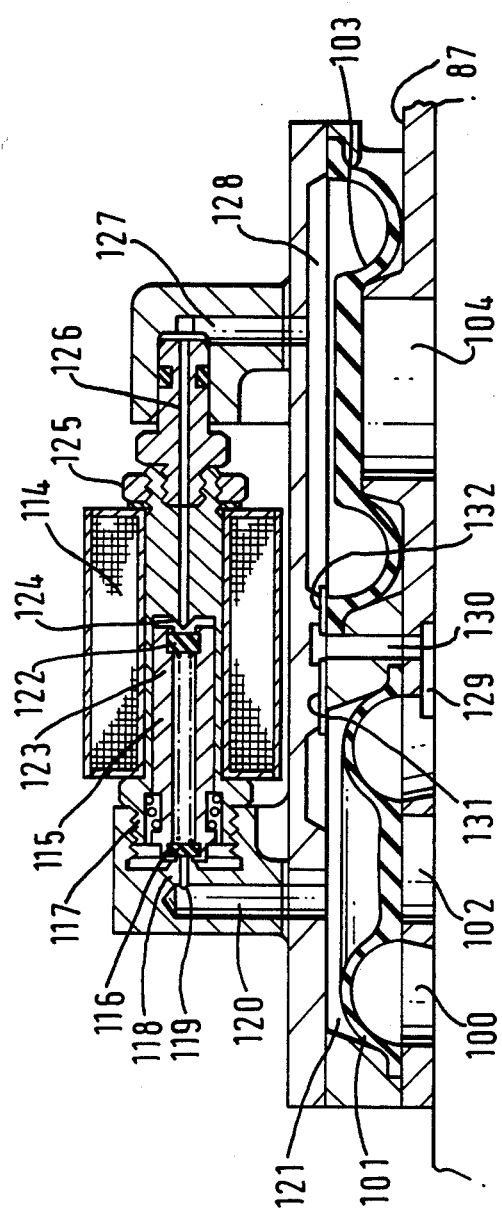
FIG. 5 is a cross-sectional view of a solenoid operated valve and two diaphragm valves controlling supply of charge gas to and venting of purge gas from a molecular sieve bed chamber.

Configuration and operation of solenoid valve 105 and associated diaphragm valves 101 and 103 of sieve bedchamber 81, will now be described with reference to FIG. 5. The solenoid valve 105 comprises an armature 114 and double acting valve member 115. An elastomeric pad valve 116 is provided in one end 117 of the valve member 115 for cooperation with a valve seat 118. The valve seat 118 surrounds an orifice 119 connecting with a passage 120 which in turn communicates with a chamber 121 in the end closure member 87. One wall of the chamber 121 is provided by that surface of the diaphragm valve 101 which faces outwardly away from molecular sieve bed chamber 81.

An elastomeric pad valve 122 in the other end 123 of the valve member 115 cooperates with a valve seat 124 provided on one end of a union assembly 125 having a central orifice 126 extending therethrough to open at the valve seat 124. At the other end of the union assembly 125 the orifice 126 connects with a passage 127 which communicates with a chamber 128 in the end closure member 87. One wall of the chamber 128 is provided by that surface of the diaphragm valve 103 which faces outwardly away from the molecular sieve bed chamber 81.

Chambers 121 and 128 are each provided with a bleed flow of charge gas supplied to the container 80, this bleed flow being provided by an orifice 129 which communicates between passageway 100 and one end of a passage 130 in the end closure member 87. Orifices 131 and 132 communicate between the other end of the passage 130 and the respective chambers 121 and 128.

Thus charge gas pressure is effective in one or the other of the chambers 121 and 128 to retain the respective diaphragm valves 101 or 103 in a closed position, dependent upon the position of the double acting valve member 115. If the double acting valve member 115 is positioned so as to bring the pad valve 116 into a position where it seats with valve seat 118 then chamber 121 will be closed and charge gas pressure will be effective therein to retain diaphragm valve member 101 in a closed position. With the valve member 115 in this position the pad valve 122 at its other end will be lifted off valve seat 124 and the chamber 128 will be communicated to ambient atmosphere by way of passage 127, orifice 126 in union assembly 125, and an outlet (not shown). The pressure of purge gas in the molecular sieve bed chamber 81 will act upon the diaphragm valve 103 to cause it to open and communicate the chamber with ambient atmosphere for venting of the purge gas.

Similar solenoid valve and diaphragm valve arrangements are provided for each of the molecular sieve bed chambers so that by sequentially operating the solenoid valves under control of an electronic timer (not shown) the sieve beds are caused to cycle through charge/supply and purge/vent phases in overlapping sequence. This ensures that a continuous supply of product gas, such as oxygen-enriched air, is made available by the molecular sieve bed container.

A molecular sieve bed container in accordance with the present invention provides a plurality of molecular sieve beds in a compact arrangement which accomplishes considerable savings in both weight and space envelope required to accommodate the container when compared with molecular sieve beds provided in individual containers. The wall thickness of the inner wall structures is reduced by at least half compared with the wall thickness of the outer housing, this thickness reduction being limited mainly by the requirement to provide some rigidity for ease of handling during assembly of the container. Also, substantial weight saving is effected by the requirement for only two end closure members as compared with the total number of end closure members required for the same number of sieve beds provided in individual containers.

What is claimed is:

1. A molecular sieve bed container including concentric tubular members and end closure members closing respective opposite ends of said concentric tubular members to form discrete chambers, at least three separate molecular sieve beds including molecular sieve material for retaining nitrogen in air supplied to said sieve beds, said molecular sieve material filling said discrete chambers, each said chamber being of substantially constant cross-sectional area in extending between the end closure members, annular resilient sealing elements sealing the inner concentric tubular members with at least one of said end closure members, filter plates located at each end of each sieve bed between the molecular sieve material and the end closure members, springs acting between the end closure member and the filter plates at one end of said container to retain the molecular sieve material in a compact condition, valve means in one of said end closure members for passing a supply of charge gas into the sieve beds and for venting purge gas from the sieve beds comprising an individual pair of valves associated with each respective sieve bed, and means in said other end closure member for delivering a supply of product gas and for passing some of said product gas back through said sieve beds as purge gas.

2. A molecular sieve bed container in accordance with claim 1, wherein each said individual pair of valves comprise diaphragm valves.

3. A molecular sieve bed container in accordance with claim 1, further comprising solenoid operated valve means controlling opening and closing of each valve in a pair of said valves.

4. A molecular sieve bed container in accordance with claim 1, wherein the container comprises three discrete chambers filled with molecular sieve material for retaining nitrogen in air supplied to said three sieve beds, and two discrete chambers filled with molecular sieve material for retaining oxygen in air supplied to said two sieve beds, whereby in operation separate supplies of oxygen-enriched gas and nitrogen-enriched gas are delivered as product gasses from said container.

5. A molecular sieve bed container comprising,
three concentric tubular members;
a respective end closure member closing respective opposite ends of the tubular members;
three discrete chambers defined by said tubular members and said end closure members, each said chamber being of constant cross-sectional area in extending between said end closure members;
three molecular sieve beds provided one in each of said three discrete chambers by molecular sieve material for retaining nitrogen in air supplied to the sieve beds;

annular resilient sealing elements sealing the inner concentric tubular members with at least one of said end closure members;

springs acting between the end closure member and the filter plates at one end of the container to retain the molecular sieve material in a compact condition;

an individual pair of valves associated with each sieve bed provided in one of said end closure members for passing a supply of air to said associated sieve bed and for venting purge gas therefrom;

valve means in said other end closure member for delivering a supply of oxygen-enriched product gas from said container and for passing some of said oxygen-enriched product gas back through said sieve beds as purge gas.

6. A molecular sieve bed container comprising, five concentric tubular members;

a respective end closure member closing respective opposite ends of the tubular members;

five discrete chambers defined by said tubular members and said end closure members, each said chamber being of constant cross-sectional area in extending between said end closure members;

three molecular sieve beds provided one in each of three of said five discrete chambers by molecular sieve material for retaining nitrogen in air supplied to the sieve beds;

two molecular sieve beds provided one in each of two of said five discrete chambers by molecular sieve material for retaining oxygen in air supplied to the sieve beds;

annular resilient sealing elements sealing the inner concentric tubular members with at least one of said end closure members;

filter plates located at each end of each sieve bed between the molecular sieve material and the end closure member;

springs acting between the end closure member and the filter plates at one end of the container to retain the molecular sieve material in a compact condition;

an individual pair of valves associated with each sieve bed provided in one of said end closure members for passing a supply of air to said associated sieve bed and for venting purge gas therefrom;

valve means in said other end closure member for delivering a supply of oxygen-enriched product gas from said three molecular sieve beds comprised by nitrogen retaining molecular sieve material and for passing some of said oxygen-enriched product gas back through said sieve beds as purge gas;

valve means in said other end closure member for delivering a supply of nitrogen-enriched product gas from said two molecular sieve beds comprised by oxygen retaining molecular sieve material and for passing some of said oxygen-enriched product gas back through said sieve beds as purge gas;

whereby in operation separate supplies of oxygen-enriched product gas and nitrogen-enriched product gas are delivered from the container.

* * * * *